May 27, 1969
P. V. PAULUS
3,445,965
RESILIENT CORNER GASKET
Filed March 13, 1967
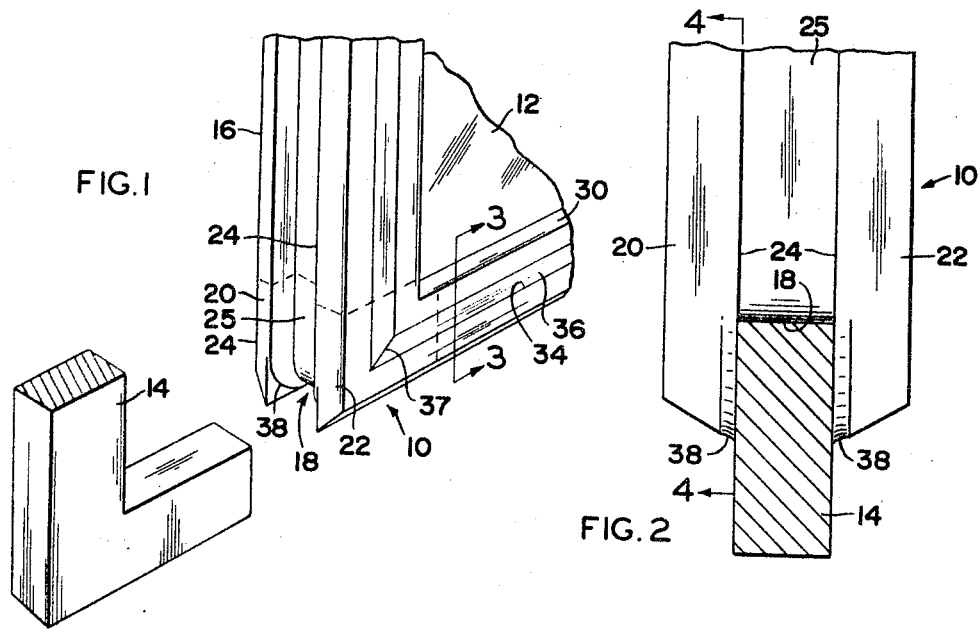
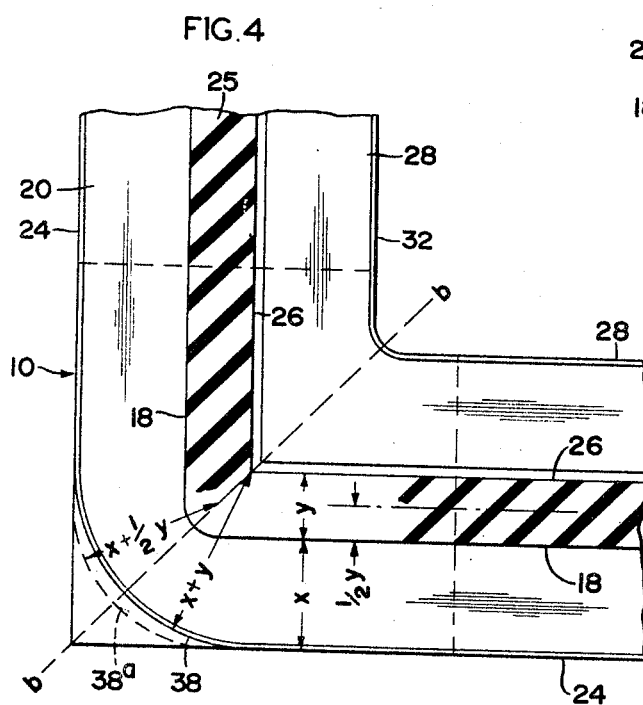
INVENTOR.
PETER V. PAULUS
BY
Meyer, Tilberry & Body
ATTORNEYS.

United States Patent Office 3,445,965
Patented May 27, 1969

3,445,965
RESILIENT CORNER GASKET
Peter V. Paulus, Port Clinton, Ohio, assignor to The Standard Products Company, Cleveland, Ohio, a corporation of Ohio
Filed Mar. 13, 1967, Ser. No. 622,721
Int. Cl. E06b 1/00
U.S. Cl. 49—479            3 Claims

ABSTRACT OF THE DISCLOSURE

A corner gasket having a frame-receiving channel, with a cross-web forming the bottom of the channel and a pair of wings having terminal sealing lips forming the side walls of the channel. Curvilinear pressure concentrating ridges are provided on the side walls around the corner of gasket, and have a radius of curvature defined in terms of the thickness of the cross-web and the distance from the bottom of the channel to the sealing lips.

---

This invention relates to the gasket art and more particularly to a resilient corner gasket.

The present invention is particularly applicable to resilient corner gaskets adapted to be interposed between the corner portions of sheet glass and a frame, and it will be described with particular reference thereto; however, it will be appreciated that the invention has broader applications and may be used in various other gasketing arrangements.

Resilient gaskets, formed from elastomeric materials, such as neoprene, are widely used for mounting, sealing and cushioning panels, such as sheet glass, in a wall of a building or in automobile bodies. In general, such gaskets comprise opposed channel members separated by a cross-web defining the bottom surfaces thereof, one channel member adapted to receive a construction member such as a sheet of glass, and the other adapted to receive a frame member. The channel members have outwardly extending, generally parallel wings, which preferably terminate at their extremities in inwardly directed lips adapted to sealingly engage the members inserted therebetween.

The attainment of a weather-tight gasket seal is assisted by the provision of a groove running longitudinally of the gasket, adjacent one wing of each of the opposed channels. The groove is adapted to receive a locking strip, which urges the adjacent wings toward the frame and panel members.

Some difficulty has been experienced in providing a satisfactory gasket-to-frame seal at angular corners. This is believed to be due to the fact that the pressure exerted by the sealing lips at the frame corners is less than the pressure exerted by the lips against straight edge portions of the frame. Consequently, air and water can infiltrate between the gasket and frame at the corners. The present invention is addressed to a solution for this problem.

In accordance with the present invention, there is provided, in a resilient corner gasket, means for sealingly engaging an inside corner of a frame, comprising an apex portion formed by the convergence of angularly disposed external, channel members, each having a bottom defined by a surface of a cross-web having a transverse thickness $y$, and side walls defined by outwardly extending, generally parallel wings terminating at their extremities in inwardly directed lips located at transverse distance $x$ from the channel bottom-defining surface of the cross-web, and a pair of opposed pressure concentrating ridges positioned on the wings and defining tangential, curvilinear extensions of the inwardly directed lips around the apex portion, each ridge having a radius of curvature as measured along an imaginary line bisecting the apex, equal to a value within the range of $(x+\frac{1}{2}y)$ to $(x+y)$.

It is, therefore, an object of the present invention to provide an improved resilient corner gasket.

A further object of the invention is to provide a resilient corner gasket having improved gasket-to-frame sealing characteristics.

Yet another object of the invention is to provide a resilient corner gasket operative to apply substantially the same pressure to the corner portion of the frame as is applied to straight edge portions of the frame.

These and other objects and advantages will become apparent from the following detailed description of a preferred embodiment of the invention when read in connection with the accompanying drawings, in which:

FIG. 1 is a schematic partially exploded pictorial view of a preferred embodiment of the present invention;

FIGURE 2 is a schematic end view of the embodiment shown in FIGURE 1, with the gasket operatively engaging the frame;

FIGURE 3 is a schematic section view taken generally along line 3—3 of FIGURE 1; and FIGURE 4 is a greatly enlarged schematic section view taken generally along line 4—4 of FIGURE 1.

Referring now to the drawings, wherein the showings are for purposes of illustrating preferred embodiments of the invention only, and not for the purpose of limiting the same, FIGURE 1 shows a resilient corner gasket, designated generally as 10, interposed between a sheet of glass 12, and a frame 14. Resilient corner gasket 10 together with straight lengths of gasket 16, form a peripheral seal for plate glass 12 with respect to frame 14. In general, straight lengths of gasket material are extruded, and corner gaskets are molded. The straight lengths and corner portions are attached to each other by vulcanization, the use of adhesives, or some other similar means.

As best seen in FIGURE 3, the corner gasket, and correspondingly the straight lengths of gasket comprise an external channel 18, having side walls defined by outwardly extending generally parallel wings 20 and 22, terminating at their extremities in inwardly directed lips 24 and a bottom defined by a surface of cross-web 25. On the opposite side of the gasket from external channel 18, is internal channel 26, having side walls defined by outwardly extending generally parallel wings 28 and 30, terminating at their extremities in inwardly directed lips 32 and a bottom defined by a surface of cross-web 25. It will thus be seen that resilient corner gasket 10 is formed by the convergence of angularly disposed external channel members with each other and angularly disposed internal channel members with each other. External channel 18 is adapted to receive frame 14 between wings 20 and 22. Frame 14 is held in sealing engagement with the gasket by inwardly directed lips 24. Internal channel 26 is adapted to receive glass plate 12 between wings 28 and 30. The glass plate is held in sealing engagement with the gasket by opposed inwardly directed lips 32.

As illustrated in FIGURES 1 and 4, the surfaces of cross-web 25 forming the bottom of external channel 18 converge to form a radiused corner. This arrangement provides pressure relief in the event the inside corner of a frame does not form a sharp angle, as where the corner is reinforced with a weldment or fillet, or because the angle is obstructed with dirt or the like.

The preferred gasket shown is further provided with groove 34 extending longitudinally of the gasket, adjacent wing 22 of external channel 18 and wing 30 of internal channel 26. Groove 34 is adapted to receive locking strip 36, which urges wings 22 and 30 into sealing engagement with frame 14 and glass sheet 12, respectively. The locking strip may be mitered or butted as shown at 37 (FIGURE 1) to facilitate corner installation.

As shown in FIGURE 4, the transverse distance between inwardly directed lip 24 and the adjacent surface of cross-web 25, is a distance $x$. The sealing pressure applied to the frame is a function of this distance, and it will be seen that the distance is constant along with the edge portions of the frame. At the corner of the frame, however, it will be seen that distance $x$ would increase if the converging lips 24 met at a sharp right angle, and thus, the pressure applied by inwardly directed sealing lip 24 would decrease proportionately, rendering the corner susceptible to infiltration by weather.

In accordance with the present invention, this problem is overcome by providing a pair of opposed curvilinear, pressure concentrating ridges 38, on wings 20 and 22 (see FIGURE 2), and defining tangential, curvilinear extensions of lips 24 around the apex portion of the corner gasket. The radius of curvature of the ridges 38 is critical as will now be defined.

Referring again to FIGURE 4, the transverse thickness of cross-web 25 has been marked $y$, and one-half the thickness, $\frac{1}{2}y$. An imaginary line bisecting the apex angle of the gasket is shown as line $b$—$b$. Recalling that ridges 38 are tangential to lips 24, the ridges have a radius of curvature as measured along line $b$—$b$, equal to a value within the range of $(x+\frac{1}{2}y)$ to $(x+y)$.

Stated another way, the radius of curvature of ridges 38 can range from a minimum radius equal to one-half the transverse thickness of cross-web 25 plus the transverse distance from lip 24 to the adjacent surface of cross-web 25, to the total transverse thickness of cross-web 25, plus the transverse distance from lip 24 to the adjacent surface of cross-web 25. With the further limitation that ridges 38 are tangential to lips 24, the center of curvature of the ridges readily can be located as a point on line $b$—$b$ as illustrated in FIGURE 4.

Ridges 38 constitute the sole pressure bearing portions in the plane of wings 20 and 22 at the apex portion of frame 14. Thus, the pressure applied to the corner of the frame is uniform and substantially equal to the pressure applied to the linear edge portions of the frame making the apex portion of the corner gasket weathertight. It will be noted that wings 20 and 22 extend beyond ridges 38 in a manner to retain the sharp angular configuration of the gasket at the apex portion. These extensions are maintained out of contact with the frame, whereby all of the sealing pressure is concentrated at ridges 38. In this manner, the pressure applied to the frame around its entire periphery is uniform and substantially equal.

The present invention has been described in conjunction with certain structural embodiments; however, it is to be appreciated that various structural changes may be made in the illustrated embodiments without departing from the intended scope and spirit of the present invention as defined in the appended claims.

Having thus described my invention, I claim:

1. In a resilient corner gasket, means for sealingly engaging an inside corner of a frame comprising an apex portion formed by the convergence of angularly disposed, external channel members, each having a bottom defined by a surface of a cross-web having a transverse thickness $y$, and side walls defined by outwardly extending, generally parallel wings terminating at their extremities in inwardly directed lips located a transverse distance $x$ from said surface of said cross-web, and a pair of opposed pressure concentrating ridges, one positioned on each of said wings radially inwardly of the extremities of said wings, and defining continuous, tangential, curvilinear extensions of said inwardly directed lips around said apex portion, each of said ridges having a radius of curvature as measured along an imaginary line bisecting said apex, equal to a value withi the range of $(x+\frac{1}{2}y)$ to $(x+y)$ said ridges providing the sole pressure bearing surface against the frame corner, in the plane of said wings.

2. The resilient corner gasket as defined in claim 1 wherein the bottoms of said external channel members converge in a radiused corner.

3. The resilient corner gasket as defined in claim 1 wherein said wings extend beyond the said ridges, forming a sharp angular corner.

References Cited

UNITED STATES PATENTS

| | | | |
|---|---|---|---|
| 2,547,799 | 4/1951 | Wernig | 52—397 X |
| 2,878,535 | 3/1959 | Bush | 52—208 |
| 3,009,216 | 11/1961 | Kimber | 52—403 X |
| 3,279,124 | 10/1966 | Brown | 49—479 |

JOHN E. MURTAGH, *Primary Examiner.*